(12) United States Patent
Zaderko (10) Patent No.: US 12,071,575 B2
(45) Date of Patent: Aug. 27, 2024

(54) PROCESS FOR OBTAINING OF FLUORALKYLATED CARBON QUANTUM DOTS

(71) Applicant: NOVACIUM, Solaize (FR)

(72) Inventor: Alexander Zaderko, Brovary (UA)

(73) Assignee: NOVACIUM, Solaize (FR)

( * ) Notice: Subject to any disclaimer, the term of this patent is extended or adjusted under 35 U.S.C. 154(b) by 524 days.

(21) Appl. No.: 17/413,591

(22) PCT Filed: Dec. 3, 2019

(86) PCT No.: PCT/IB2019/060397
§ 371 (c)(1),
(2) Date: Jun. 14, 2021

(87) PCT Pub. No.: WO2020/121119
PCT Pub. Date: Jun. 18, 2020

(65) Prior Publication Data
US 2022/0041924 A1   Feb. 10, 2022

(30) Foreign Application Priority Data
Dec. 14, 2018   (UA) .................. a 2018 12454

(51) Int. Cl.
C09K 11/06    (2006.01)
C01B 32/15    (2017.01)
C09K 11/65    (2006.01)

(52) U.S. Cl.
CPC .............. *C09K 11/06* (2013.01); *C01B 32/15* (2017.08); *C09K 11/65* (2013.01)

(58) Field of Classification Search
CPC .......... C09K 11/65; C09K 11/06; C01B 32/15
See application file for complete search history.

(56) References Cited

U.S. PATENT DOCUMENTS

| 8,648,217 B2 | 2/2014 | Navarrini et al. |
| 9,613,759 B2 | 4/2017 | Gao et al. |
| 2012/0178099 A1 | 7/2012 | Jana |

FOREIGN PATENT DOCUMENTS

| CN | 108529601 A | 9/2018 |
| EP | 1558376 A2 | 8/2005 |

(Continued)

OTHER PUBLICATIONS

Zuo et al., "Large Emission Red-Shift of Carbon Dots by Fluorine Doping and Their Application for Red Cell Imaging and Sensitive Intercellular Ag+ Detection", J. Phys. Chem. C 2017, 121, 26558-26565, Nov. 11, 2017.*

(Continued)

*Primary Examiner* — C Melissa Koslow
(74) *Attorney, Agent, or Firm* — BCF LLP (57) ABSTRACT

The invention discloses a simple, scalable and convenient solvothermal method of obtaining fluoralkylated carbon quantum dots—Fluocar® Nano materials, by solvothermal pyrolysis of an organic substance in the presence of fluoroorganic substance that contain fluoroalkyl groups. The obtained material is water- and organic solvents soluble, grafted fluorine is hydrolytically stable, and obtained dots having intense luminescence in a wide range of wavelengths, from blue to NIR. Photoluminescent (PL) spectral map of obtained carbon dots solution is highly sensitive to pH changes and rare earth metal ions concentration in this solution. Also PL-map of such material is sensitive to organic complex moiety (e.g. Acidum salicylicum, and penicillinum).
Synthesized materials can find use as the classic and fluorescent dye replacement, as the carrier of biologically active substances, for bio-imaging, theranostic, for cytological (Continued)

studies, (photo)catalysis, as electrode component, as well as a sensor or biosensor, or for other uses.

9 Claims, 6 Drawing Sheets

(56) References Cited

FOREIGN PATENT DOCUMENTS

| UA | 121357 U | 12/2017 |
|---|---|---|
| WO | 2016072959 A1 | 5/2016 |
| WO | 2018056801 A1 | 3/2018 |

OTHER PUBLICATIONS

Bao et al., "In vivo theranostics with near-infrared-emitting carbon dots-highly effecient photothermal therapy based on passive targeting after intravenous aministration", Light: Science & Applications 7(91), 2018.

Bhunia et al., "Carbon Nanoparticle-based Fluorescent Bioimaging Probes", Scientific Reports 3(1473), 2013.

Bourlinos et al., "Photoluminescent Carbogenic Dots", Chemistry of Materials, 20(14), 2008, pp. 4539-4541.

Budarin et al., "Chemical reactions of double bonds in activated carbon: microwave and bromination methods", Chemical Communications, 2004, pp. 2736-2737.

Carrillo-Carrion et al., "Taking Advantage of Hydrophobic Fluorine Interactions for Self-Assembled Quantum Dots as a Deliery Platform for Enzymes", Angewandte Chemie International Edition, 57, 2018, pp. 5033-5036.

Dimos, "Carbon Quantum Dots: Surface Passivation and Functionalization", Current Organic Chemistry, 20, 2016, pp. 682-695.

Ghosh Dastidar et al., "Porous microspheres: Synthesis, characterization and applications in pharmaceutical & medical fields", International Journal of Pharmaceutics, 548, 2018, pp. 34-48.

Gong et al., "Small but strong: The influence of fluorine atoms on formation and performance of graphene quantum dots using a gradient F-sacrifice strategy", Carbon 112, 2017, pp. 63-71.

Hargreaves et al., "Nanographite Synthesized from Acidified Sucrose Microemulsions under Ambient Conditions", Crystal Growth & Design, 16, 2016, pp. 3133-3142.

Hill et al., "Fluorescent carbon dots from mono- and polysaccharides: synthesis, properties and applications", Beilstein Journal of Organic Chemistry, 13, 2017, pp. 675-693.

Huang et al., "Structures and properties of fluorinated amorphous carbon films", Journal of Applied Physics, 96(1), 2004, pp. 354-360.

Li et al., "Carbon and Graphene Quantum Dot for Optoelectonic and Energy Devices: A Review", Advanced Functional Materials, 25 (31), 2015, pp. 4929-4947.

Li et al., "Near-Infrared Excitation/Emission and Multiphoton-Induced Fluorescence of Carbon Dots", Advanced Materials, 30(13), 2018.

Li et al., "Theranostic Carbon Dots with Innovative NIR-II Emission for in Vivo Renal-Excreted Optical Imaging and Phototermal Therapy", ACS Applied Materials & Interfaces, 11(5), 2019, 4737-4744.

Miao et al., "Synthesis of Carbon Dots with Multiple Color Emission by Controlled Graphitization and Surface Functionalization", Advanced Materials, 2017.

Patt et al., "F- and C-labelling of quantum dots with n.c.a. [F]fluoroethyltosylate and [C]methyliodide: a feasibility study", Journal of radioanalytical and nuclear chemistry, 283(2), pp. 287-491, Sep. 2009.

Wang et al., "Recent progress in carbon quantum dots : synthesis, properties and applications in photocatalysis", Journal of Materials Chemistry A, 5(8), 2017, pp. 3717-3734.

Ye et al., "Laser-Induced Conversion of Teflon into Fluorinated Nanodiamonds or Fluorinated Graphene", ACS Nano 12(2), 2018, pp. 1083-1088.

Yousaf et al., "Fluorine functionalized graphene quantum dots as inhibitor against hIAPP amyloid aggregation", ACS Chemical Neuroscience, 8(6), 2017, pp. 1368-1377.

Zholobak et al., "Facile fabrication of luminescent organic dots by thermolysis of citric acid in urea melt, and their use for cell staining and polyelectrolyte microcapsule labelling", Beilstein Journal of Nanotechnology, 7, 2016, pp. 1905-1917.

\* cited by examiner

PROCESS FOR OBTAINING OF FLUORALKYLATED CARBON QUANTUM DOTS

The present invention relates to nanotechnology, namely, nanostructured fluorine-containing carbon materials, in particularly, to fluoralkylated carbon quantum dots, which can be used as luminescent materials, contrasts in magnetic resonance imaging (MRI), as biochemical agents for research, therapy and visualization in cell biology, tissues and other biological objects, for the transport of chemicals into cells and/or biological tissues, as sensors or signaling materials, or as the electrode materials for storage or electrical power sources, or as the (photo)catalyst. Also, because of their high optical extinction and wide luminescence, in the spectral range from blue to NIR, aforementioned carbon dots can replace luminescent dye, inks, or tags for authenticity protection, labeling marking, etc. Having the nanoscale sizes, aforementioned particles can be successfully used as sensor components to create a variety of sensors devices and various composites with plastics, resins and for using as fluorescent label in various approaches.

This invention describes the process for obtaining carbon quantum dots with (per)fluoroalkyl functional surface grafted groups. The (per)fluoroalkyl groups are chemically and hydrolytically stable and give unique properties to the carbon quantum dots.

This invention builds on the priority of the UA invention patent application a201812454 and further develops the invention disclosed in [1], which is that the carbon material (CM) can graft the active residues of fluoroorganic substances which are produced by homolytic decomposition. The factor of homolysis may be high temperature [1], the presence of the initiator of free radical chemical reaction [2], or other factors, such as γ-radiation [3], or UV light [4]. Processes taking place on the surface of a carbon material accelerate homolysis in statu nascendi, which is suitable for both materials formed in the melt by carbon source pyrolysis (e.g. carbon quantum dots—nanostructured carbon materials) and for materials with high oxygen content during their thermal transformations (e.g. carbon microspheres—microstructured CM).

Unfortunately, the process described in Ref. [1] is not suitable for fluorination of carbon quantum dots (O-dots), because the Freon-treated dots lose solubility and produce slurry at the reported treatment temperature.

The present invention discloses the process for obtaining a fluorine-containing nanostructured carbon material by solvothermal pyrolysis of organic carbon source material in the presence of fluoroorganic molecular compound which has a labile functional group capable of being decomposed during homolysis with the formation of active species. Resulting species can attach to the active centers on the surface of the carbon material or has a functional group capable to embed in the structure of the carbon matrix during the matrix growth.

The prior art is a method of fluorination of carbon material by specific fluoroorganic compounds, namely, perfluoroacyl peroxides, which, due to the nature of the peroxide bond, are easily decomposed at high temperature [5]. It also described the method of attaching more thermally stable substances to the carbon materials under the influence of microwave irradiation [6]. Also known a method for producing carbon microspheres in the presence of a source of fluorine—an inorganic fluorine-containing substance, namely, fluoroborate tetrabutylammonium or ammonium fluoride [7].

An object of the invention is a simple method for producing fluorine-containing nanostructured carbon materials, wherein the fluorine-containing functional groups are graft to the carbon material surface, it's important because electron acceptor functional groups attached to the surface of such materials significantly change their spectral properties and hydrophobicity [25].

The technical result of the invention is solvothermal method of obtaining nanostructured fluoralkylated carbon quantum dots by reaction of with fluoroorganic substance containing a labile functional group (groups) as sources of fluorine.

Methods for producing carbon materials, in particular, nanostructured ones, have been intensively developed in recent years, and they are quite diverse [8].

The solvothermal methods for obtaining of carbon quantum dots are also quite diverse, well-studied and have many applications [9, 14, 16].

Commonly, carbon materials obtained by this way contain many oxygen-containing groups, and, in the case of quantum dots, so-called O-dots, they are synthesized at 150-170° C. from a citric acid dissolved in the urea melt [10]. Thus, the authors of [11] obtained fluorinated QD_F quantum dots by ligand exchanging: trioctylphosphine oxide (TOPO) that captured CdSe/ZnS nanoparticles was changed on fluorinated HS-C11-(EG)$_4$-OC(CF$_3$)$_3$ ligand.

In Ref. [12], the authors synthesized the fluorinated carbon nano-dots according to the procedure sequence: 100 mg of fluorographene was dissolved in 10 ml of concentrated sulfuric acid that contains 3 ml of water, and then the mixture was sonicated until homogenized. Thereafter, another 10 ml of concentrated H$_2$SO$_4$ and 60 ml of HNO$_3$ were added. Further, the solution was sonicated for 3 hours, and then placed in a thermostat at 70° C. overnight. After cooling, 200 ml of deionized distilled water was added to the mixture, and the pH was adjusted to a neutral.

In Ref. [13], the authors also decomposed a graphite fluoride by using a hydrothermal method. The obtained fluorinated carbon quantum dots named F-GQDs have many oxygen-containing groups and a diameter of 1-7 nm.

The authors of [17] obtain functionalized fluorinated graphene dots by microwave-induced thermal decomposition of glucose (180° C., 500 W, 3 h) in the presence of hydrogen fluoride, as a fluorinating agent, and propose to use them as an inhibitor of amyloid aggregation of the biological agent hIAPP.

In Ref. [18], the authors reviewed methods used for obtaining carbon quantum dots, in particular, from citric acid and organic amine, however, the authors did not consider the possibility of obtaining fluorine-containing dots, and, in addition, for example, the Bourlinos method [19] that involves heating a mixture of citric acid and amine to a temperature above 300° C. Other authors, as can be seen in Refs. [20, 21], report on solvothermal synthesis of NIR-emitting carbon dots in the DMFA and DMSO solutions. In Ref. [24], a method for obtaining of NIR-emitting carbon dots by hydrothermal carbonization of fruit juice was described.

A convenient method for obtaining of oxygen-rich carbon quantum dots (O-dots), is a model for the present invention considering "self-assembly" approach, for example, by solvothermolysis (solvo- or hydrothermal carbonization) of mixtures containing citric acid and urea, thiourea, ammonia or other carbon and nitrogen source materials [10].

In particular, the present invention concerns a process for obtaining fluoralkylated carbon quantum dots through solvothermal process of carbonization of an organic substance forming a carbon source, in the presence of a fluoroorganic substance that contains a (per)fluoroalkyl group and at least one of the following substituents selected from the group consisting of: —NH2, —CONH2, —COOH, —OH, —C=O, or halogen atom other than fluorine: wherein, during said process, the carbon source and the fluoroorganic substance form carbon quantum dots that contain (per) fluoroalkyl groups that are grafted to the matrix of said carbon quantum dots. Advantageously, the carbon source can be selected from the group consisting of urea, thiourea, cyanuric acid, condensation products of urea and/or thiourea. (poly)saccharide, citric acid or tartaric acid.

Moreover, the fluoroorganic substance can be selected from the group consisting of trifluoroacetic acid, halofluoroalkane, trifluoromethyl aniline, or other (per)fluoroalkylated aniline or salt thereof. Furthermore, the solvothermal process can be carried out in the temperature of the range of 120-350° C.

In some embodiments, the solvothermal process can be carried out without adding of organic solvent. On other embodiments, the solvothermal process can be carried out with adding of organic solvent.

In an aspect of the invention, the obtained carbon dots can be doped by fluorine, with a total fluorine content≤0.5 mmol/g. In variant, the obtained carbon dots can be doped by fluorine, with a total fluorine content>0.5 mmol/g.

Advantageously, the solvothermal process can be carried out with microwave irradiation.

The present invention implements an approach in which the process of obtaining of fluorine-containing carbon nanomaterials is carried out in the liquid phase in the presence of fluoroorganic substance, which contains at least one (per) fluoroalkyl group and a labile functional group particularly, carboxyl, ketone, aldehyde, alcohol, ether or ester in such synthesis conditions, that promote the reaction of fluorine source with a carbon source and/or carbon quantum dot matrix, including during growth or formation of such dots. Carbon O-dots obtained by the solvothermal process, in particular from mixtures of (thio)urea and oxycarboxylic acid, in particular citric, are well suited for carrying out this process, as well as quantum dots whose synthesis from mono- and polysaccharides are described in [16], as well as the mixtures used in such processes. A convenient carbon source is carboxylic acids, particularly oxy-, oxo- and amino acids, such as oxalic, citric, malic, tartaric, pyruvic, glycine, alanine, tryptophan, EDTA; aromatic amines, including phenylene diamines, or other aromatic (poly)amines; nitrilotriacetic, glutamic acid; or their salts; polyhexamethylene guanidine; urotropin, (oligo)saccharides; alkaloids, including caffeine; α-glucosyl hesperidin; phenylenediamines, acidum asparagicum or even untreated fruit juice, because it contains at least one component from listed above.

Reactions of carbon source and fluoroorganic substance and if necessary nitrogen source can be carried out in the solution in organic solvents, e.g. dimethylformamide (DMFA), dimethylsulfoxide (DMSO), dimethylacetamide (DMA), N-methyl pyrrolidone, formamide, alcohols, polyethylene glycol (PEG), aromatic or aliphatic hydrocarbons, acetic or other suitable carbonic acid, ethers or esters and other solvents, or even aqua.

It should be noted that the addition of fluoroorganic substances, particularly trifluoroacetic acid in a mixture of urea and citric acid during solvothermal synthesis leads to the formation of fluorine-containing material doped with fluorine. If a mixture of components is used for synthesis in the following proportions (molar) urea:citric acid:trifluoroacetic acid as 3:2:1. At this ratio of components obtained at 160° C., quantum dots contain 0.15 mmol/g of fluorine. The content of fluorine can hardly be explained by adsorption, since if the synthesis is carried out similarly, but with an increase in the amount of urea, in a ratio of 5:2:1, then the resulting product will contain only trace amounts of fluorine. The low content of fluorine in the products of synthesis using trifluoroacetic acid can be explained by the fact that under the conditions of synthesis it is almost completely dissociated, whereas in the process mostly unassociated carboxyl groups are involved.

If a substance capable of alkylation (in particular of a nitrogen atom) is used as a source of fluorine, for example, a halogen other than fluorine, in particular dibromotetrafluoroethane (R-114B2, $BrCF_2CF_2Br$), then such substance can be alkylated as a carbon source (urea, bi- and triurete, uric acid, and especially sulfur atom thiourea), and hydrolyze to form perfluoroethylene glycol. In the first case, the nanoparticles will be formed from a fluorinated carbon source, and in the second, the substance itself—the hydrolysis product will act as a building block for the quantum dot. Of course, such an alkylator can interact with the suitable carbon moiety by the mechanism described in [1]. A particular embodiment of the invention is the introduction into the reaction medium of an interaction product of a fluoroorganic source of fluorine and a nitrogen-containing substance, in particular, products of the interaction of a fluorine-containing alkylator and urea, thiourea, amine, urotropin or heterocyclic compound; whereby a salt of fluoroorganic amine and organofluorine acid can be used as a source of fluorine, in this case, the volatility of both the amine and the acid is reduced. In the case where such a substance is a quaternary amine, the process takes place in the presence of a surfactant which changes the course of its flow and the properties of the material obtained.

A wide range of fluoroorganic compounds can be used as a source of fluorine: various aliphatic, aromatic, heterocyclic carboxylic acids, amines, alcohols, phenols, ethers, esters, ketones, aldehydes, (substituted) (thio)urea with fluoroorganic compounds and representatives of fluoroorganic compounds; the above-mentioned compounds containing functional groups —$CF_2$—, —CF=, —$CF_3$, or —$OCF_3$, including a variety of refrigerants and other available fluorinated organic substances. The most suitable fluorine-containing substance for such process are aromatic amines with a (per)fluoroalkyl group(s) attached to the aromatic ring, e.g., trifluoromethyl anilines, bis- or poly-(trifluoromethyl) anilines, or other perfluoroalkyl anilines or other perfluoroalkylated amines, including perfluoroalkylated benzyl- or phenethylamines or aliphatic amines, depending on the specific application task for which the quantum dots will be used. It's naturally, the fluoroorganic substance itself can be a source of carbon, and, if necessary, they can be a source of nitrogen (e.g., fluoralkylated amine, including perfluoroalkyl anilines).

Figure 1:
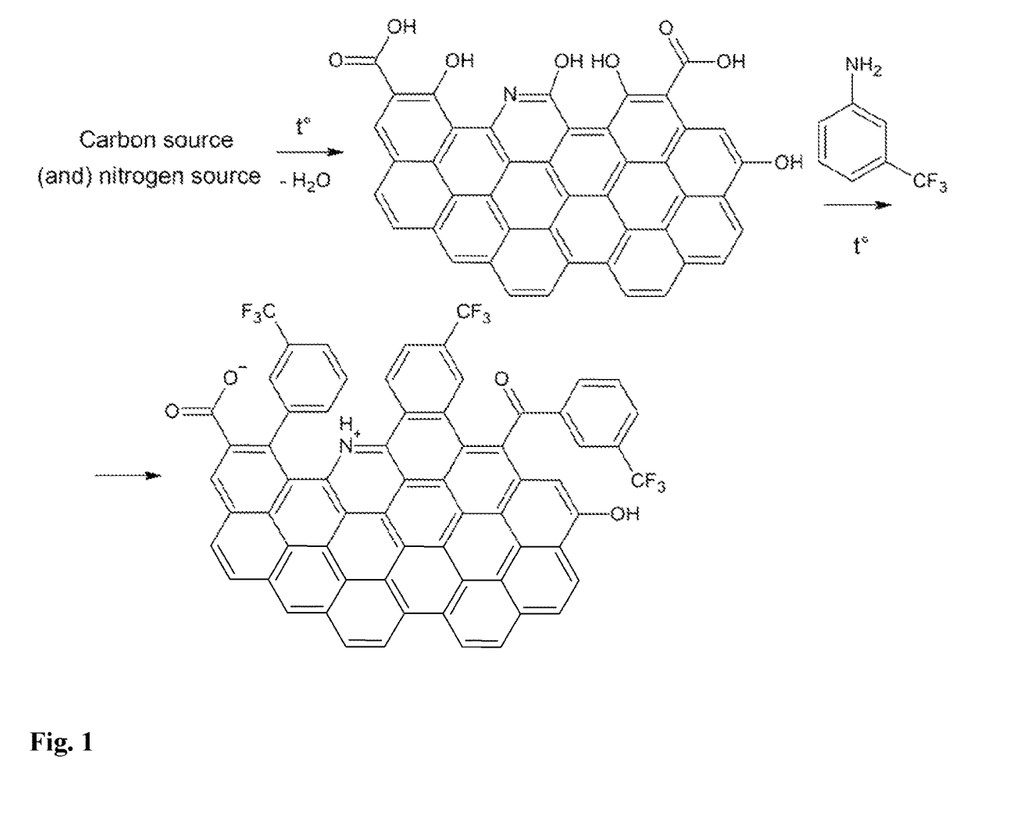
FIG. 1 is a scheme of a chemical reaction used for the formation of carbon quantum dots, and the surface interaction with a fluorine-containing compound, on the example of trifluoromethyl aniline.

The scheme disclosing the formation of the synthesized carbon dots from citric acid, urea and m-trifluoromethyl aniline is shown in FIG. 1.

FIG. 1. The scheme of chemical reaction used for the formation of carbon quantum dots, and the surface interaction with a fluorine-containing compound, on the example of trifluoromethyl aniline.

It should be noted that the fluorine content in the synthesized products cannot be explained by the adsorption of the fluoroorganic compound on the carbon material. If one adds fluorine-containing amine (e.g. m-trifluoromethyl aniline) to an aqueous-alcoholic solution of O-dots obtained from citric acid and urea, in the proportion of 1 mmol of amine per 1 g of 0-dots, withstand the mixture for 2 hours, precipitate the dots with acid, separate, and dry the resulting product, the fluorine content in it will be about 0.05 mmol/g. X-ray photoelectron spectra (XPS) of dry product are demonstrated in FIG. 2.

Figure 2:
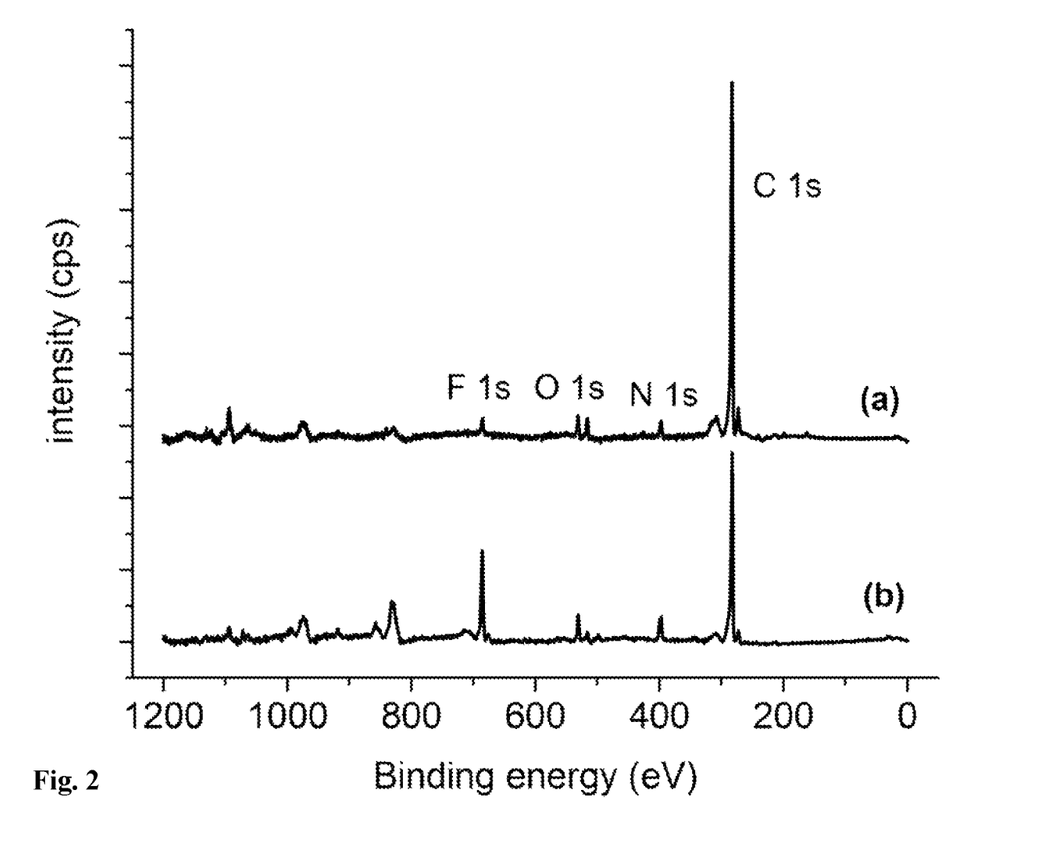
FIG. 2 is a X-ray fluorescence spectra of fluorine supplemented with urea, citric acid, and trifluoroacetic acid quantum dots (a) and spectra of fluorocarbon quantum dots obtained from urea, citric acid, and m-trifluoromethylaniline taken as a base (b)

FIG. 2. X-ray fluorescence spectra of fluorine supplemented with urea, citric acid, and trifluoroacetic acid quantum dots (a) and spectra of fluorocarbon quantum dots obtained from urea, citric acid, and m-trifluoromethylaniline taken as a base (b).

The analysis of the fluorine-containing samples was carried out in a nickel crucible by dissolving the sample in alkali melt containing sodium nitrate. After dissolution, the melt was disbanded in water. To determine the content of chloride or bromide, argentometric titration was used according to Volgard method. The fluorine content was determined by potentiometry with a fluoride-selective electrode "ELIS-131(F)" which potential was estimated relative to the chlorine silver comparative electrode ESR-101.01 using an electronic circuit based on the precision LMC6001AIN amplifier constructed by Texas Instruments; the measurement error was approximately 7%. Weighing during analyzes was performed by means of a Sartorius Quintix™ 124-1OR analytical balances. A TRP-09TP (KUPP BAJT, Zhytomyr, Ukraine) temperature regulator was used for heating and PID control of temperature. Microwave heating was performed in a 750 W household microwave oven MWS-1705 (Supra, PRC).

A centrifuge Sigma 4-16KS was used for centrifugation, with a set of Microsep Omega filters, from 10 to 1 kDa grade. Spectral properties of the obtained solutions were investigated with the Hamilton Instrument Varian Cary 50 Scan UV/Vis Spectrophotometer and Varian Cary Eclipse Fluorescence Spectrophotometer. The cuvette Hellma 111-QS from quartz Suprasil® was used for UV-Vis and fluorescent spectroscopy measurements. Raman-spectra of HCl-precipitated powders were recorded with Raman-microscope Horiba LabRAM Aramis. Fourier-transform infrared spectra in an attenuated total reflectance mode (FTIR ATR) were collected on an IRPrestige 21 spectrophotometer (Shimadzu Corporation, Japan) by accumulating 1,000 scans at a resolution of 2 $cm^{-1}$. The MIRacle module (PIKE Technology, Madison, WI, USA) with a ZnSe crystal plate for powdered sample contact was used during ATR measurements. XPS-spectra were recorded by XSAM-800 Kratos spectrometer. Zetasizer Nano ZS (Malvern Panalytical Ltd., United Kingdom) was used for particles ζ-size distribution measurements.

Measuring and common laboratory glasses were used for synthesis, analysis, titration and sample preparation were supplied by Simax™|Kavalierglass a.s. and Technosklo s.r.o., Czech Republic (supplier: Mankor LLC, Kyiv, Ukraine).

The luminescent properties were tested with a Wood glass equipped Convoy S2+ UV flashlight, at 3 W power, with a maximum of emission at 365 nm.

The reagents and solvents used for the synthesis, analysis, sample preparation and auxiliary operations of the pro synthesis, pro analysis or purissimum grade were purchased from Ukrorgsynthesis LLC (Kyiv, Ukraine) and Himlabor-reaktiv LLC (Brovary, Ukraine).

To study the effect of fluorinating substance in the process of solvothermal synthesis of carbon quantum dots, a mixture of urea with anhydrous citric acid taken in molar ratio 2:1 was carbonized at 135-165° C. (product—CQD); also mixture of urea with citric acid in the presence of m-trifluoromethyl aniline in molar ratio 2:1:0.5 was carbonized under similar conditions (product—CQD). Products of reactions were dissolved in aqueous i-PrOH; a part of this solution was treated with hydrochloric acid to precipitate synthesized particles. Subsequently, solutions of the melt and solid precipitates were investigated as described below.

Diluted solutions of both products, FCQD and CQD, obtained after dissolving the melt in an alcohol-water mixture completely pass through the filters, up to marked 1 kDa filter, into the filtrate by centrifugation. At the same time, the extinction spectra and luminescence maps of solutions both before and after filtering do not differ. The D (at 1369 $cm^{-1}$) and G (1579 $cm^{-1}$) characteristic bands of graphene are clearly visible in the Raman spectrum (FIG. 3) of the solid FCQD precipitation product with acid, while no such bands are observed for the CQD precipitate, which indicates a much higher degree of ordering in the fluorinated particles [22].

Obtained fluoralkylated dots have a pH-dependent spectrum of luminescence and extinction. 0.03% solution of said dots demonstrates pH-indicator behavior during pH change. In acidic medium, the dots solutions have a yellow color, but in alkaline solution, their color is pink. These changes are completely reversible. Also, the solution demonstrates significant luminescence damping, if rare earth elements (e.g. $Eu^{3+}$, $Er^{3+}$ or $Tb^{3+}$), or other polyvalent cations ($Al^{3+}$) added to the solution. The same is true for complex organic substances, such as chlorhexidine, penicillin, salicylic acid, and others. These properties can serve for the sensory approach of these dots.

Figure 3:
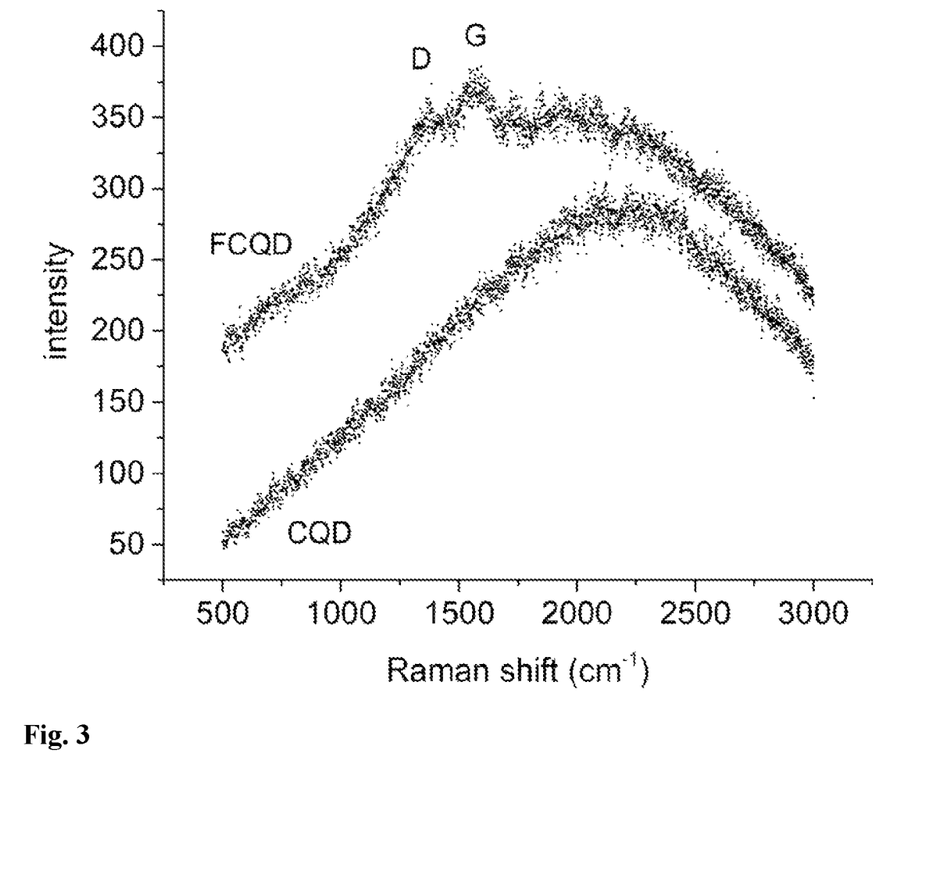
FIG. 3 is a Raman-spectra (excited at 633 nm) of CQD synthesized from citric acid and urea, and of FCQD synthesized in similar conditions but in tbc presence of m-trifluoromethyl aniline.

FIG. 3. Raman-spectra (excited at 633 nm) of CQD synthesized from citric acid and urea, and of FCQD synthesized in similar conditions but in the presence of m-trifluoromethyl aniline.

Solutions of both FCQD and CQD, obtained ater solvothermal synthesis are readily subjected to thin-layer chromatography on Silufol UV 254 plates by using 1:1 isopropyl alcohol-water mixture as the mobile phase. In this case, the FCQD chromatogram shows one fluorescent spot (component B), colored blue in UV light; otherwise, the FCQD solution gives two spots on the chromatogram: fluorescent by blue (component B) and yellow (component Y) colors. Moreover, the separation coefficients Rf of components B for both cases are very close, while component Y passes ahead of component B.

Figure 4:
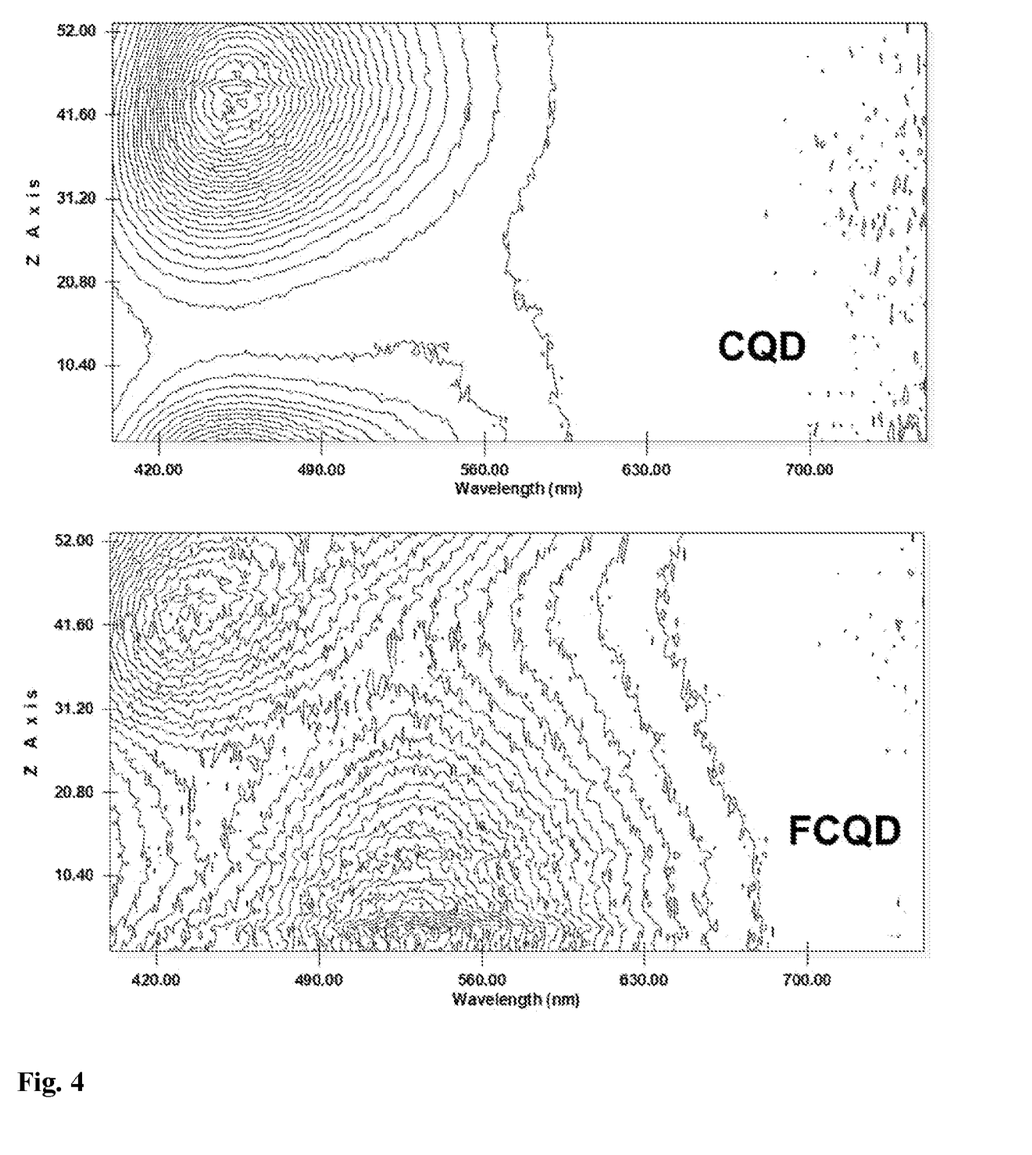
FIG. 4 is a luminescence mapping of 0.03% water solutions of CQD synthesized from citric acid and urea (taken in 2 to 1 molar ratio), and FCQD synthesized in similar conditions but in the presence of m-trifluoromethyl aniline.

Also, CQD and FCQD show different luminescence and excitation spectra (FIG. 4). For the fluorinated one, we can see two bands in the spectra. The first band below to the "component B", and second band belong to the "component Y"—fluoralkylated carbon quantum dots.

FIG. 4. Luminescence mapping of 0.03% water solutions of CQD synthesized from citric acid and urea (taken in 2 to 1 molar ratio), and FCQD synthesized in similar conditions but in the presence of m-trifluoromethyl aniline.

Extinction spectra (FIG. 5) of CQD and FCQD is similar, but with some differences, for fluorinated one, peak at 350 nm decreased and shoulder at 440 nm transformed to the peak.

Figure 5:
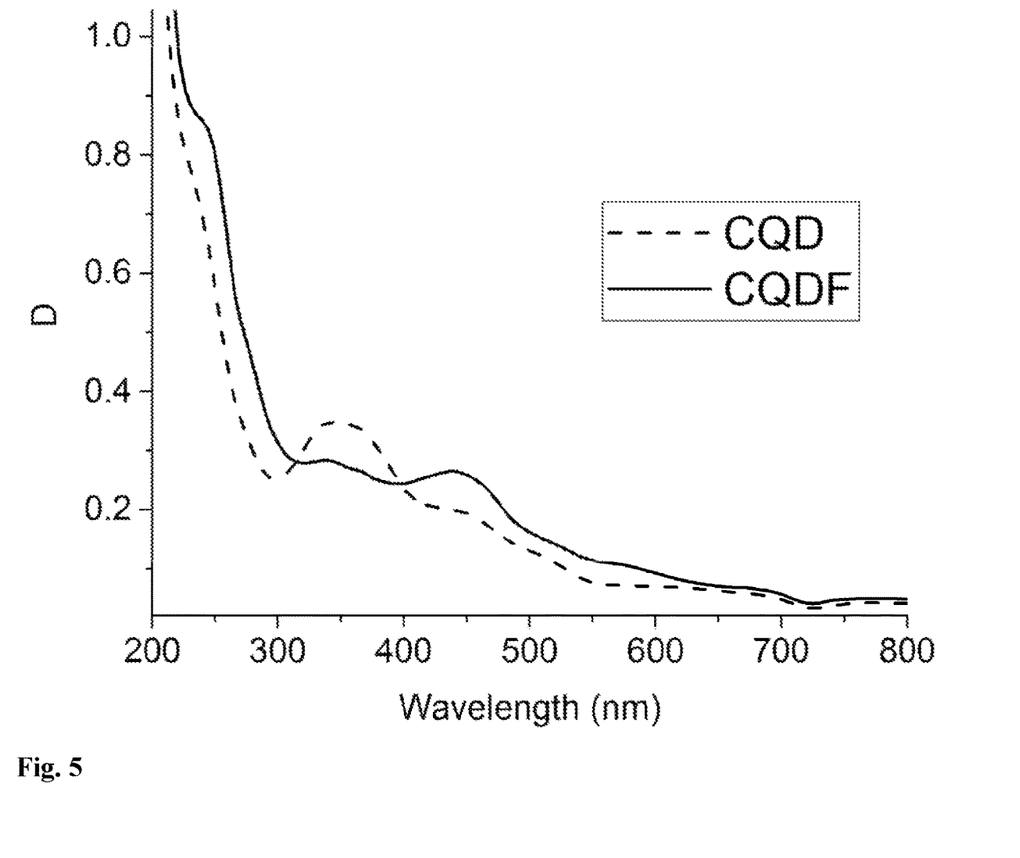
FIG. 5 is an extinction spectra of 0.03% water solutions of CQD synthesized from citric acid and urea (2 to 1 molar ratio), and FCQD synthesized in similar conditions but in the presence of m-trifluoromethyl aniline.

FIG. 5. Extinction spectra of 0.03% water solutions of CQD synthesized from citric acid and urea (2 to 1 molar ratio), and FCQD synthesized in similar conditions but in the presence of m-trifluoromethyl aniline.

Figure 6:
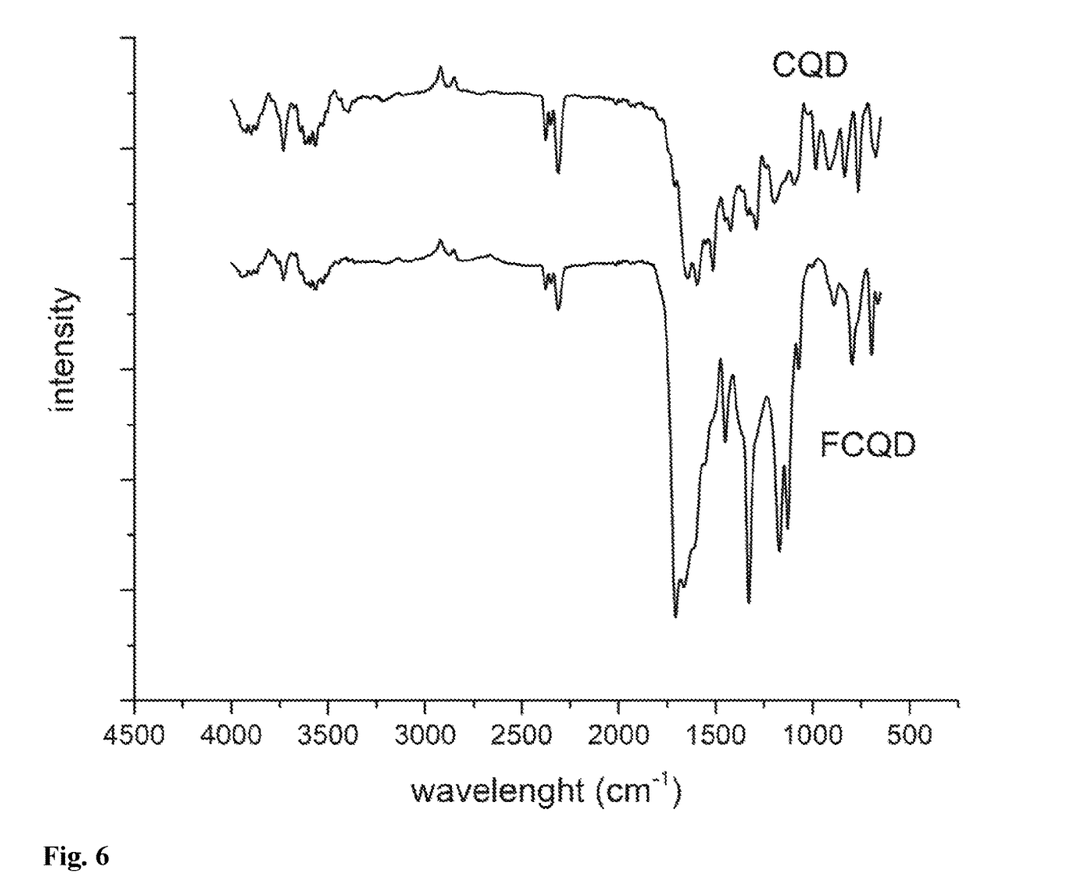
FIG. 6 is a FTIR ATR spectra of CQD synthesized from citric acid and urea (2 to 1 molar ratio), and FCQD synthesized in similar conditions but in the presence of m-trifluoromethyl aniline.

FIG. 6 shows clear $CF_x$ (x=1-3) fluoroorganic groups bands in the ATR spectra at 1125-1170 and at 1330 cm$^{-1}$ [23], that not observing on the spectra of non-fluorinated CQD powder.

FIG. 6. FTIR ATR spectra of CQD synthesized from citric acid and urea (2 to 1 molar ratio), and FCQD synthesized in similar conditions but in the presence of m-trifluoromethyl aniline.

The size of particles, measured by ζ-sizer in 0.03% FCQD solution in 0.25 M NaCl, is in the range of 2-3 nm. This size distribution was obtained for freshly centrifuged NPs at 11,000 g during 15 min. During 30 min time, these particles shown agglomeration and their hydrodynamic size increased significantly.

The data obtained indicate that the synthesis of the product FCQD contains fluoralkylated graphene quantum dots.

The invention is illustrated by the following examples.

EXAMPLE 1

11 g of a mixture of urea (p.a.), citric acid (pharm.) and trifluoroacetic acid (pro synth.) in a molar ratio of 3:2:1 was placed in a 100 ml glass autoclave.

The autoclave was sealed with a screw cap with a silicone-Teflon gasket and placed in a shaft furnace, the temperature of which was set pointed to 140° C. for 20 minutes. This temperature was maintained for 1 hour. The mixture melted and turned yellow. The temperature was then raised to 160° C. and continued heating in an open autoclave for 1.5 hours. The reaction resulted in a solid foamed product of colored black, which is very easily soluble in 15% aqueous i-propanol. An aqueous-alcoholic solution of quantum dots was acidified with hydrochloric acid and centrifuged for 1 h at 8000 rpm. The precipitate obtained was washed with water, again centrifuged, and then dried at 120° C. in air.

The resulting crumbly carbon black material is readily soluble in water, the aqueous-alcoholic mixture and the solutions have strong orange luminescence in an alkaline and blue luminescence in a neutral medium.

According to the results of chemical analysis, the material contains 0.15 mmol/g of fluorine.

A fluorine signal at about 686 eV, which is characteristic of the fluorine C—F bonds in the carbon material, is clear visible in the XPS spectrum of the product obtained.

For comparison, a similar synthesis was performed increasing the number of urea equivalents to 5. The product obtained contains a small amount of fluorine, which is difficult to determine by potentiometric method.

EXAMPLE 2

A mixture of urea, anhydrous citric acid and dibromotetrafluoroethane (refrigerant R-114B2, CAS#124-73-2) taken in a molar ratio of 3:2:1 was treated as described in Example 1.

The resulting product is readily soluble in water, and the solution has a strong blue luminescence in the neutral pH range and yellow-green luminescence in alkaline medium. According to results from the analysis, the obtained carbon nanomaterial contains 0.12 mmol/g of fluorine and 0.15 mmol/g of bromine.

EXAMPLE 3

Anhydrous citric acid and m-trifluoromethylaniline (>99%. CAS #98-16-8, mTFMA) were mixed in a mole ratio of 2:1; 1.7 g of mixture was transferred to a glass autoclave which was placed in an oven as described in Example 1. The mixture was kept in a tightly closed autoclave at 120° C. for 1 hour, then at 140° C. for 1 hour and finally at 165° C. for 1 hour. A yellow viscous liquid was formed, which then solidified into jelly-like mass with intense yellow-green luminescence, indicating the formation of quantum dots. The autoclave was opened and heated again to 165° C. and maintained for 1.5 hours. A clear smelt of yellow color was obtained, which was almost insoluble in water, but easily dissolved in isopropanol with the formation of a clear yellow solution having intense yellow-green luminescence. Thus the formed quantum particles are hydrophobic.

EXAMPLE 4

Urea, anhydrous citric acid and m-trifluoromethylaniline were mixed in a ratio of 1.5:2:1, and 1.98 g of mixture were treated as in Example 3. The product obtained at the carbonation stage is dark-brown shiny solid foam which is easily soluble in isopropanol/water mixture. An obtained homogeneous dark brown solution was filtered off and acidified to pH=1 with hydrochloric acid. The particles were immediately coagulated, and the precipitate obtained was easily separated on a yellow tape paper filter. The precipitate was washed and dried at 85° C. for 2 hours, and the obtained product is a light brown loose powder, insoluble in water, poorly soluble in an alcohol-aqueous mixture, and well soluble in an alkaline aqueous solution. Alkaline solutions exhibit intense blue luminescence. According to the results of the analysis, the obtained dry product contains 1.82 mmol/g of fluorine and 0.29 mmol/g of chlorine. For XPS studies, the obtained material was treated with alkali and centrifuged from the solution.

The XPS-spectrum of the obtained product shows an intense fluorine signal at 686 eV, characteristic of the fluorine atom associated with the carbon atom in the carbon material.

EXAMPLE 5

A mixture of urea, citric acid and 2,3-difluorobenzoic acid (DFBC, pro synth., CAS#4519-39-5) taken in a molar ratio of 3:1.5:1 and has the total weight of 1.46 g containing 170 mg DFBC, was treated analogously to the method reported in Example 3. A solid shiny brittle product that was obtained has colored dark brown. It is easily dissolved in hot distilled water without alcohol adding, forming a dark brown solution, which has a yellowish-green luminescence in the concentrated form, and intensive green-green luminescence in the dilute solutions.

After acidification, separation, and drying at 120° C. for 2 hours, the resulting product contains 0.06 mmol/g of fluorine.

EXAMPLE 6

The synthesis of fluoralkylated carbon quantum dots (FCQD) was carried out analogously to Example 4, but the ratio of urea:citric acid:amine was 2:2:1, the total weight of the mixture was 2.07 g, and the synthesis was carried out in a closed reactor. The resulting product is easily and completely dissolved in hot water to form a homogeneous dark brown solution with bright green luminescence. The solution was acidified with concentrated HCl, the precipitate was filtered off, washed several times with 0.1 M HCl, water, and then dried at 120° C. for 10 h. After synthesis, the glass of the autoclave became turbid, that is, during the synthesis some HF was formed, indicating a deep transformation of the fluoroorganic substance. After precipitation of the particles with concentrated hydrochloric acid, washing with 0.1 M HCl and drying, 155 mg of a dark brown powder, insoluble in water and 15% alcohol, and readily soluble in aqueous alkali were obtained, whereby the resulting solution has a bright orange luminescence. In the obtained dry product, the fluorine content is 2.47 mmol/g.

In comparison, 100.0 mg of quantum carbon dots (CQD), which are synthesized from urea and citric acid with no fluorine in their compositions, were dissolved in 25 ml of 15% i-propanol. 16.1 mg of mTFMA was added to the solution, and then the solution was kept for 2 hours at room temperature under continuous stirring. Thereafter, the carbon dots were recovered by HCl acidification and further treated as described in this Example. The fluorine content of the obtained product is 0.05 mmol/g.

EXAMPLE 7

The synthesis was carried out analogously to Example 6, but additional component 2,3-difluorobenzoic acid (DFC) was added to the mixture of urea, citric acid, and mTFMA. The ratio of urea, citric acid, and amine to benzoic acid was 3:3:1:1. In this case, the total mass of the mixture was 5.68 g. After the reaction in the autoclave formed a characteristic crystalline sublimation/sublimate of DFBC, and the product is a dark brown, in a thin layer of transparent melts, which is well soluble in the hot water-alcohol mixture, whereby, this solution has dark green luminescence. Product weight is 0.42 g, it contains 1.50 mmol/g of fluorine.

Such an embodiment of the invention allows reducing the volatility of the fluoroorganic compound(s) by forming a less volatile combined fluoroorganic compound.

EXAMPLE 8

A mixture of urea, citric acid and (p-trifluoromethoxy) phenyl thiourea synthesized from p-trifluoromethoxy aniline (CAS#461-82-5) and benzoyl isothiocyanate was reacted as indicated in Example 6 and taken in a molar ratio of urea:citric acid:thiourea as 2:3:1, with the total mass of 2.03 g. The resulting product contains 1.88 mmol/g of fluorine, it is soluble in aqueous alkali, and such a solution has bright orange luminescence.

EXAMPLE 9

A mixture of biuret/triurete/cyanuric acid obtained by pyrolysis of urea and citric acid in the presence of 3,5-bis (trifluoromethyl) aniline (pro synth., CAS#328-74-5) and trifluoroacetic acid taken in a weight ratio of 1:1:0.5:0.45 was treated as in Example 6, but in a steel autoclave at 350° C. for one hour. The obtained carbon nanomaterial contains 2.75 mmol/g of fluorine, whereby its solution has a yellow-hot luminescence in an alkaline solution.

EXAMPLE 10

A mixture of thiourea, tartaric acid and perfluorobutyryl chloride (CAS#375-16-6) in a molar ratio of 2:2:1 in a total mass of 1.26 g was treated in a microwave oven powered at 750 W for 30 seconds, after this treatment, the resulting mixture was cool to room temperature and melted again under microwave irradiation to form brown melt. The resulting carbon nanomaterial has a red luminescence in an alkaline aqueous solution and contains 0.32 mmol/g of fluorine.

EXAMPLE 11

The synthesis of FCQD was carried out as described in Example 6, but in the presence of 10 ml of DMFA, in the sealed ampoule at 200° C. for 12 h. Obtained dark-brown solution have a dark-red luminescence. The product obtained by HCl-precipitation contains 1.13 mmol of fluorine.

EXAMPLE 12

2 mmol of urea (p.a., 120 mg) and 2 mmol of anhydrous citric acid (pharm., 384 mg) were mixed and 20 g of fresh DMFA was added. 3.1 g of this solution was mixed with 60 mg of p-trifluoromethyl aniline (p-TFMA), and then placed in an ampoule and sealed. The ampoule was kept at 180° C. for 12 hours, while the ampoule content became colored bloody-red and in undiluted state fluoresces in red. The product obtained by HCl-precipitation contains 0.75 mmol/g of fluorine; however, in this case, the amount of the resulting product is small.

EXAMPLE 13

The synthesis of FCQD was carried out as described in Example 2, but tartaric acid was used instead of citric, and 120 mg of 3,4-bis(trifluoromethyl) aniline was used instead of p-TFMA. Obtained brown solution shows orange luminescence in the UV-light; the precipitate contains about 1.30 mmol/g of fluorine.

EXAMPLE 14

The synthesis of FCQD was carried out as described in Example 6, but the molar ratio of urea:citric acid:mTFMA was 1:1:1. Resulted product in a 0.03% solution has clear yellow luminescence in acidic medium and greenish-blue luminescence in alkaline medium. On a thin layer chromatogram, it's visible, that the quantity of component Y is more than in the Example 6. So, an increased quantity of the fluoralkylated amine increases the "yellow component" quantity in the solvothermal product.

EXAMPLE 15

3 mmol of citric acid and 3 mmol of m-trifluoromethyl aniline was sealed in the ampoule and heated in the shaft furnace at 270° C. for 15 hours. Dark brown melt has a red fluorescence in UV range. Melt easy soluble in ethanol (3.5 ml), and the resulting solution was filtered via an Acrodisc of 0.22 µm, and the obtained solution has red luminescence.

The following examples clarify the embodiment of the invention but do not limit the scope of the rights arising therefrom.

This invention also can be realized in different ways with many combinations of carbon and/or nitrogen source in the presence of a wide range of fluoroorganic substances with using of different solvents or without solvent, in autoclaves of different sizes and constructions, in the wide temperature range.

For the nanomaterials obtained by the claimed method, the author proposes to use the name Fluocar® Nano.

REFERENCES

1. International Publication WO2016072959, Method for carbon materials surface modification by the fluorocarbons and derivatives/A. Zaderko, V. Prusov, V. Diyuk//Pub. May 12, 2016 (IPEA amended); US10000382, issued Jun. 19, 2018; Invention patent UA110301, issued Oct. 10, 2015.
2. Ukraine utility model UA121357U//A. Zaderko, V. Diyuk/Method of fluoroalkylation of carbon materials in the liquid phase, 2017, Industrial Property Bulletin, 23.
3. European Patent Application EP1558376//Zubov V. P., Plobner L., Kapoustine D. V., Balayan H., Muydinov M. R., Brem G., Leiser R.-M./Sorbent material having a covalently attached perfluorinated surface with functional groups.
4. Laser-Induced Conversion of Teflon into Fluorinated Nanodiamonds or Fluorinated Graphene/R. Ye, X. Han, D. V. Kosynkin, Y. Li, C. Zhang, B. Jiang, A. A. Marti, J. M. Tour//ACS Nano 12 (2), 1083-1088, (2018).
5. USA patent US8648217B2//Navarrini W., Sansoteira M. et al., Modification of carbonaceous materials, issued (2017).
6. Chemical reactions of double bonds in activated carbon: microwave and bromination methods/Budarin V. L., Clark J. H., Tavener S. J., Wilson K.//Chem. Commun. (Camb), (2004).
7. Method for preparing fluorine/nitrogen co-doped graphitized carbon microspheres with high volumetric specific capacitance/F. Gao, Zh. Junshuang, J. Zhang, L. Zhichao, L. Hou//USA Patent U.S. Pat. No. 9,613,759, (2017).
8. Porous microspheres: Synthesis, characterization, and applications in pharmaceutical & medical fields/D. G. Dastidar, M. Chowdhury//International Journal of Pharmaceutics, V. 548(1), -2018, P. 34-48//doi: 10.1016/j.ijphaim.2018.06.015
9. Carbon and Graphene Quantum Dots for Optoelectronic and Energy Devices: A Review/X. Li, M. Rui, J. Song, Z. Shen, H. Zeng//Advanced Functional Materials, 25(31), (2015).
10. Facile fabrication of luminescent organic dots by theimolysis of citric acid in urea melt, and their use for cell staining and polyelectrolyte microcapsule labeling/ Zholobak N. M., et al.//Beilstein J. Nanotechnol, (2016) 7, p. 1905-1917, doi: 10.3762/bjnano.7.182.
11. Taking Advantage of Hydrophobic Fluorine Interactions for Self-Assembled Quantum Dots as a Delivery Platform for Enzymes/Carrillo-Carrion C., et al.//Angew Chem Int Ed Engl. 2018. //doi: 10.1002/anie.201801155.
12. Carbon 112, -2017, -p. 63-71//doi: 10.1016/j.carbon.2016.10.091
13. Small but strong: The influence of fluorine atoms on formation and performance of graphene quantum dots using a gradient F-sacrifice strategy//P. Gong, J. Wang, K. Hou, Z. Yang, Z. Wang, Z. Liu, X. Han, S. Yang, Carbon 112, -2017, p. 63-71.
14. Fluorescent carbon dots from mono- and polysaccharides: synthesis, properties and applications, S. Hill, M. C. Galan//Beilstein J. Org. Chem. 2017; 13: 675-693, -2017// doi: 10.3762/bjoc.13.67.
15. Nanographite Synthesized from Acidified Sucrose Microemulsions under Ambient Conditions/N. J. Hargreaves, S. J. Cooper Cryst. Growth Des. 2016, 16, 3133-3142//doi: 10.1021/acs.cgd.5b01753.
16. Carbon Nanoparticle-based Fluorescent Bioimaging Probes/S. K. Bhunia, A. Saha, A. R. Maity, S. C. Ray, N. R. Jana//Scientific Reports, 3: 1473, //doi: 10.1038/srep01473.
17. Fluorine Functionalized Graphene Quantum Dots as Inhibitor against hIAPP Amyloid Aggregation/M. Yousaf, H. Huang, P. Li, Ch. Wang, Ya. Yang//ACS Chemical Neuroscience, Vol. 8(6), p. 1368-1377 (2017)//doi: 10.1021/acschemneuro.7b00015
18. Carbon Quantum Dots: Surface Passivation and Functionalization/K. Dimos//Current Organic Chemistry, 2016, 20, p. 682-695
19. Photoluminescent carbogenic dots/A. B. Bourlinos, A Stassinopoulos, D. Anglos, R. Zboril, V. Georgakilas, E. P. Giannelis//Chem. Mater., 2008, 20(14), p. 4539-4541.
20. Synthesis of Carbon Dots with Multiple Color Emission by Controlled Graphitization and Surface Functionalization/X. Miao, D. Qu, D. Yang, B. Nie, Y. Zhao, H. Fan, Z. Sun//Adv. Mater. 2017, 1704740 doi: 10.1002/adma.201704740
21. In vivo theranostics with near-infrared-emitting carbon dots—highly efficient photothermal therapy based on passive targeting after intravenous administration/X. Bao, Y. Yuan, J. Chen, B. Zhang, D. Li, D. Zhou, P. Jing, G. Xu, Y. Wang, K. Holá, D. Shen, C. Wu, L. Song, C. Liu, R. Zbořil, S. Qu//Science & Applications (2018) 7: 91, doi: 10.1038/s41377-018-0090-1
22. Recent progress in carbon quantum dots: synthesis, properties and applications in photocatalysis/Wang, R., Lu, K.-Q., Tang, Z.-R., & Xu, Y.-J.//Journal of Materials Chemistry A, (2017), 5(8), 3717-3734. doi: 10.1039/c6ta08660h
23. Structures and properties of fluorinated amorphous carbon films/K. P. Huang, P. Lin, H. C. Shih//Journal of Applied Physics 96, 354 (2004). doi: 10.1063/1.1755849
24. Theranostic Carbon Dots with Innovative NIR-II Emission for in Vivo Renal Excreted Optical Imaging and Photothermal Therapy/Y. Li, G. Bai, S. Zeng, J. Hao//ACS Appl. Mater. Interfaces 2019, 11, 5, 4737-4744. doi: 10.1021/acsami.8b14877
25. Near-Infrared Excitation/Emission and Multiphoton-Induced Fluorescence of Carbon Dots/D. Li, P. Jing, L. Sun, Y. An, X. Shan, X. Lu, D. Zhou, D. Han, D. Shen, Y. Zhai, S. Qu, R. Zbořil, A. L. Rogach//Advanced Materials, V. 30(13). doi: 10.1002/adma.201705913

The invention claimed is:
1. The process for obtaining fluoralkylated carbon quantum dots through solvothermal process of carbonization of an organic substance forming a carbon source, in the presence of a fluoroorganic substance that contains a (per)

fluoroalkyl group and at least one of the following substituents selected from the group consisting of: —NH$_2$, —CONH$_2$, —COOH, —OH, =C=O, or halogen atom other than fluorine; wherein, during said process, the carbon source and the fluoroorganic substance form carbon quantum dots that contain (per)fluoroalkyl groups that are grafted to the matrix of said carbon quantum dots.

2. The process for obtaining fluoralkylated carbon quantum dots as claimed in claim 1, wherein the carbon source is selected from the group consisting of urea, thiourea, cyanuric acid, condensation products of urea and/or thiourea, (poly)saccharide, citric acid and tartaric acid.

3. The process for obtaining fluoralkylated carbon quantum dots as claimed in claim 1, wherein the fluoroorganic substance is selected from the group consisting of trifluoroacetic acid, halofluoroalkane, trifluoromethyl aniline, or other (per)fluoralkylated aniline and salt thereof.

4. The process for obtaining fluoralkylated carbon quantum dots as claimed in claim 1, wherein, the solvothermal process is carried out in the temperature range of 120-350° C.

5. The process for obtaining fluoralkylated carbon quantum dots as claimed in claim 1, wherein, the solvothermal process is carried out without adding of organic solvent.

6. The process for obtaining fluoralkylated carbon quantum dots as claimed in claim 1, wherein, the solvothermal process is carried out with adding of organic solvent.

7. The process for obtaining fluoralkylated carbon quantum dots as claimed in claim 1, wherein the obtained fluoralkylated carbon quantum dots are doped by fluorine, with total fluorine content is <0.5 mmol/g.

8. The process for obtaining fluoralkylated carbon quantum dots as claimed in claim 1, the obtained fluoralkylated carbon quantum dots have a total fluorine content of >0.5 mmol/g.

9. The process for obtaining fluoralkylated carbon quantum dots as claimed in claim 1, wherein the solvothermal process is carried out with microwave irradiation.

* * * * *